Aug. 2, 1960   S. SCOPE   2,947,834
CONTROL APPARATUS
Filed Nov. 7, 1957

INVENTOR.
SOL SCOPE
BY Roger W. Jensen
ATTORNEY

United States Patent Office 2,947,834
Patented Aug. 2, 1960

2,947,834

CONTROL APPARATUS

Sol Scope, Los Angeles, Calif., assignor to Minneapolis-Honeywell Regulator Company, Minneapolis, Minn., a corporation of Delaware Filed Nov. 7, 1957, Ser. No. 695,046

7 Claims. (Cl. 200—81.9)

This invention relates primarily to the field of aviation controls and more particularly to a means for detecting a predetermined aircraft velocity.

For certain applications it is desirable to know when a vehicle or aircraft has reached a particular velocity at which time certain circuits or means are to be put into operation.

My invention utilizes a unique and inexpensive apparatus for performing such an operation while providing a relatively accurate measurement of the velocity of the vehicle at which point the circuits are to be actuated. My invention utilizes a wing or airfoil member which produces a lift representative of a particular velocity and this lift created by the airfoil is opposed by a spring of a particular spring constant. Initially the wing is in a rest position adjacent to the vehicle housing. As the vehicle decelerates or rapidly changes velocity, a movable mass causes the wing to be projected into the airstream. The wing produces a lift which exceeds the force created by the spring and moves upward or away from the vehicle until the spring is fully compressed. When the force created by the spring overcomes the lift created by the airfoil thus indicating a predetermined velocity, the airfoil is returned to its original position and an actuating circuit is energized.

It is therefore a general object of the present invention to provide a relatively simple means for developing a signal representative of a predetermined velocity.

It is a further object of the present invention to provide a velocity sensitive device which is actuated by an acceleration responsive device.

Another object of this invention is to provide an instrument which will detect a predetermined vehicle velocity.

Still another object of this invention is to provide a means for actuating certain circuits or other means when a vehicle has reached a predetermined velocity.

These and other features of the invention will be understood more clearly and fully from the following detailed description and accompanying drawing in which.

Figure 1:
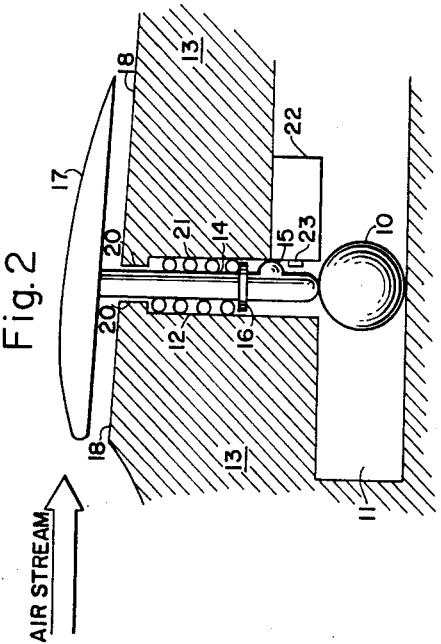
Figure 1 is a cross sectional view of a velocity sensitive device showing the various elements thereof in their initial position.

An acceleration responsive device 10 such as a steel ball or high density mass is located in a chamber 11. A bore 12 which is generally located in the vehicle housing 13 is situated at right angles to chamber 11 and projects outwardly from chamber 11 to the outer surface of housing 13. Situated in bore 12 and guided by bore 12 is a rod 14 which extends downward into chamber 11 and projects upward through bore 12. A protrusion 15 is situated near the end of rod 14 which projects into chamber 11. Located adjacent to protrusion 15 and encircling rod 14 is a retaining ring 16 which is secured to rod 14. Located on the opposite end of rod 14 is an airfoil or wing 17 which is normally nestled against the vehicle housing 13 along a surface 18 thereof. Also encircling rod 14 and located between retaining ring 16 and a necked down portion 20 of bore 12, is a spring 21. Spring 21 is shown in Figure 1 in its normally unflexed or inactive position, being disposed between necked down portions 20 and retaining ring 16. Situated adjacent to bore 12 and contained in housing 13 is an actuating device 22 such as a micro-switch or other actuating devices. Actuating device 22 is shown in Figure 1 in its normal condition which is effected by the protrusion 15 engaging an actuating pin 23 of actuating means 22 (see Figure 3).

Figure 2:
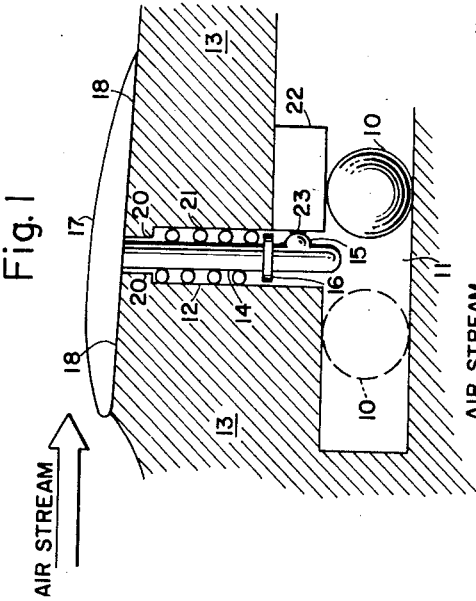
Figure 2 is a sectional view showing the airfoil being set into operation by an acceleration responsive device.
Figure 3:
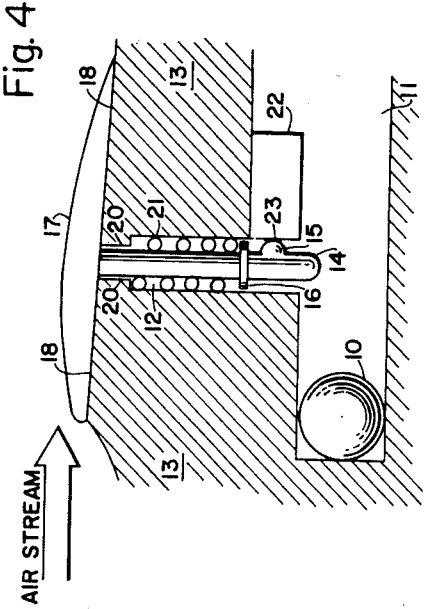
Figure 3 is a cross sectional view showing the velocity responsive member in a position which has compressed the restraining means to its utmost point.
Figure 4:
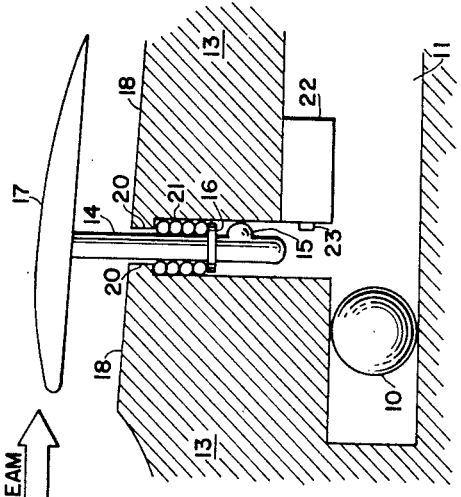
Figure 4 is a sectional view showing the position of the various members at the time the actuating device is set in operation.

In operation, movable mass 10 is subjected to a sudden change in velocity which can be either an acceleration or a deceleration and it is projected from its initial position or first position to a second position such as shown by the dashed lines in Figure 1. As the movable mass such as a steel ball 10 travels forward in chamber 11, the ball strikes the under portion or end of rod 14 which projects into chamber 11 so that rod 14 is projected upward thus moving airfoil 17 into the airstream. This is shown more in detail in Figure 2. Thus it may be seen in Figure 2 that spring 21 is being actuated by movable mass 10 since retaining ring 16 is compressing spring 21 against necked down portion 20 of housing 13. At this point in the operation the airstream is allowed to pass under airfoil 17 creating a lifting force as well as the lift created by the airstream passing over the airfoil 17. As the lift increases, airfoil 17 is projected further into the airstream and spring 21 is further compressed until it is applying its maximum opposing force to the force created by the lift of airfoil 17 as seen in Figure 3. It may now be seen that actuating device 22 has actuating pin 23 exposed such that if rod 14 were projected downward towards chamber 11 it would strike actuating pin 23 of actuating device 22. As the vehicle decelerates or as the acceleration decreases, the lift created by airfoil 17 is reduced and the restraining force produced by spring 21 tends to overcome the lift produced by airfoil 17 until finally the force produced by the restraining means 21 exceeds the lifting force created by airfoil 17 and forces rod 14 downward. As rod 14 is forced downward towards chamber 11, protrusion 15 strikes actuating pin 23 thereby setting the actuating device in operation to initiate any circuits associated therewith. This can best be seen in Figure 4 where the spring 21 is returned to its inactive position and airfoil 17 has once again assumed its position lying along the surface line 18 of housing 13.

Suitable interlocking means may be employed to prevent movable mass 10 and/or airfoil 17 from operating prematurely. The interlocking means may be of any type which would fulfill the purpose and be known to those skilled in the art.

While I have shown and described a specific embodiment of this invention, the invention should not be limited to the particular form shown, and I intend in the appended claims to cover all modifications which do not depart from the spirit and scope of the invention.

What I claim is:

1. Apparatus for detecting a predetermined velocity of a vehicle comprising: a housing forming an outer body of said vehicle; a mass capable of being displaced from a first to a second position by a change in velocity of said vehicle; a chamber located in said housing for supporting said mass; a bore in said housing located normal to said chamber and opening into said chamber; an airfoil for creating a lifting force proportional to said vehicle velocity when displaced into an airstream surrounding said vehicle; a rod coaxially aligned with said bore and guided by said bore, said rod being connected to said airfoil and projecting into said chamber for operative engagement by said mass so that said mass in moving from said first to said second position displaces said rod and said airfoil into said airstream; a ring circumferentially attached to said rod; an actuating device situated adjacent to said rod in said chamber for engaging said rod; and a compression spring for creating a compression force representative of a predetermined velocity, said spring encompassing said rod and supported by said ring on one end and by said housing on the other end so that said spring is compressed as long as said lift created by said airfoil overcomes said compression force and upon said spring compression force overcoming said lift said rod operatively engages said actuating device.

2. Apparatus for detecting a predetermined velocity of a vehicle comprising: a housing for said vehicle; a mass capable of being displaced from a first to a second position by a sudden change in velocity of said vehicle; a chamber located in said housing for supporting said mass; a bore in said housing located normal to said chamber and opening into said chamber; velocity responsive means for creating a first force proportional to said vehicle velocity; an arm guided by said bore, said arm being connected to said velocity responsive means and projecting into said chamber to be operatively engaged by said mass so that said mass in moving from said first to said second position initiates operation of said velocity responsive means; actuating means situated adjacent to said arm for engaging said arm; and restraining means for creating a force representative of a predetermined velocity and opposing said first force, said restraining means being connected to said arm so that said arm operatively engages said actuating means upon said first force being overcome by said force created by said restraining means.

3. Apparatus for detecting a predetermined velocity of a vehicle comprising: a mass capable of being displaced from a first to a second position by a sudden change in velocity of said vehicle; a support having a chamber therein for supporting said mass including an opening into said chamber; normally inoperative velocity responsive means for creating a first force proportional to said vehicle velocity including initiating means projecting into said chamber to be operatively engaged by said mass so that said mass in moving from said first to said second position initiates operation of said velocity responsive means; actuating means situated adjacent to said velocity responsive means for engagement therewith; and restraining means for creating a force representative of a predetermined velocity and opposing said first force, said restraining means being connected to said velocity responsive means so that said later named means engages said actuating means upon said first force being overcome by said force created by said restraining means.

4. Apparatus for detecting a predetermined velocity of a vehicle comprising: first means capable of being displaced by a sudden change in velocity of said vehicle; second means normally inoperative for creating a first force proportional to said vehicle velocity including means for operative engagement with said first means so that said first means after being displaced initiates operation of said second means; third means connected to said second means for creating a force representative of a predetermined velocity and opposing said first force; and fourth means situated adjacent to said second means and operably engageable by said second means upon said first force being overcome by said force created by said third means.

5. Apparatus for detecting a predetermined velocity of a vehicle comprising: acceleration responsive means; velocity responsive means normally inoperative set in operation by momentary engagement with said acceleration responsive means; actuating means located adjacent to said velocity responsive means so that said actuating means is engageable by said velocity responsive means; and restraining means operatively connected to said velocity responsive means to restrain its movement so that said velocity responsive means operates said actuating means upon said restraining means moving towards an inactive position.

6. Apparatus for detecting a predetermined velocity of a vehicle comprising: first means responsive to a sudden change in velocity; second means normally inoperative capable of being displaced from a first position to a second position upon being set in operation by momentary engagement with said first means, said second means responsive to said vehicle velocity; third means situated adjacent to said second means for engagement therewith; and fourth means opposing said displacement of said second means so that said second means is displaced from said second position to said first position to actuate said third means upon said vehicle reaching a predetermined velocity.

7. Apparatus for detecting a predetermined airstream velocity of a vehicle comprising: first means responsive to a change in velocity of said vehicle; second means normally inoperative set in operation by momentary engagement with said first means and responsive to said airstream velocity; and third means actuated by said second means upon said second means responding to said predetermined velocity.

References Cited in the file of this patent

UNITED STATES PATENTS

| | | |
|---|---|---|
| 1,836,284 | Scheibell | Dec. 15, 1931 |
| 2,197,473 | Jackson | Apr. 16, 1940 |
| 2,373,089 | Allen et al. | Apr. 10, 1945 |
| 2,716,228 | Greene | Aug. 23, 1955 |
| 2,841,667 | Stowe | July 1, 1958 |